(12) United States Patent
Hoche

(10) Patent No.: US 6,860,019 B2
(45) Date of Patent: Mar. 1, 2005

(54) TOOL HEAD OF A TRIMMER

(75) Inventor: Florian Hoche, Stuttgart (DE)

(73) Assignee: Andreas Stihl AG & Co. KG (DE)

( * ) Notice: Subject to any disclaimer, the term of this patent is extended or adjusted under 35 U.S.C. 154(b) by 40 days.

(21) Appl. No.: 10/414,170

(22) Filed: Apr. 15, 2003

(65) Prior Publication Data
US 2003/0192189 A1 Oct. 16, 2003

(30) Foreign Application Priority Data
Apr. 16, 2002 (DE) .......................... 102 16 730

(51) Int. Cl.⁷ .......................................... A01D 34/412
(52) U.S. Cl. ............................. 30/276; 56/12.1; 56/12.7
(58) Field of Search .................... 30/276, 347; 56/12.1, 56/12.7, DIG. 9

(56) References Cited

U.S. PATENT DOCUMENTS

| | | | | |
|---|---|---|---|---|
| 5,239,811 A | * | 8/1993 | Spearman | 56/12.1 |
| 6,742,263 B2 | * | 6/2004 | Ellson et al. | 30/276 |
| 2002/0116826 A1 | * | 8/2002 | Sanders et al. | 30/276 |
| 2003/0192189 A1 | * | 10/2003 | Hoche | 30/276 |
| 2004/0148783 A1 | * | 8/2004 | Cashman et al. | 30/276 |

* cited by examiner

*Primary Examiner*—Hwei-Siu Payer
(74) *Attorney, Agent, or Firm*—R W Becker & Associates; R W Becker

(57) ABSTRACT

A tool head of a trimmer is provided, and has a gear mechanism housing and a rotatably drivable tool shaft that is mounted in the housing. Held upon the tool shaft is a hub portion that rotates with the tool shaft. On that side that faces the hub portion, the tool head is provided with at least one stripping edge, which has a radial component that extends from the inside to the outside, and which projects beyond the contour of the hub portion.

10 Claims, 2 Drawing Sheets

TOOL HEAD OF A TRIMMER

BACKGROUND OF THE INVENTION

The present invention relates to a tool head of a brush cutter or trimmer.

Trimmers are provided with a guide tube having an inwardly disposed drive shaft, whereby provided at one end of the guide tube is a tool head having a rotatably drivable cutting tool, and provided at the opposite end of the guide tube is a drive motor for the cutting tool. The cutting tool can be a cutting blade, a cutting filament, or the like, and during operation is guided through underbrush, grass, or similar material that is to be cut. Material that has been cut off accumulates in the hub portion of the cutting tool, and if the speed of the tool is great enough this material is flung off due to the centrifugal forces that are effective.

To improve the ability to handle such trimmers, a compact and lightweight manner of construction is desired, especially in the region of the tool head, which is to be guided manually. A compact construction with a small diameter of the region of the tool hub leads to relatively low centrifugal forces, even when the operating speed is high. In particular, wet material that has been cut off, and which is therefore sticky, can accumulate in this region without it being possible for the centrifugal forces to adequately fling this material off. Longer material such as grass or the like can be wound onto the hub region and can lead to impairment of the function of the trimmer. Especially with embodiments where a pressure plate for the cutting tool that is to be disposed thereagainst projects radially beyond the outer contour of the tool head, such an undesirable winding of cut-off material onto the hub portion is reinforced.

It is therefore an object of the present invention to improve a tool head of the aforementioned general type for a trimmer in such a way that its functional reliability is improved, even under difficult, cutting conditions.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
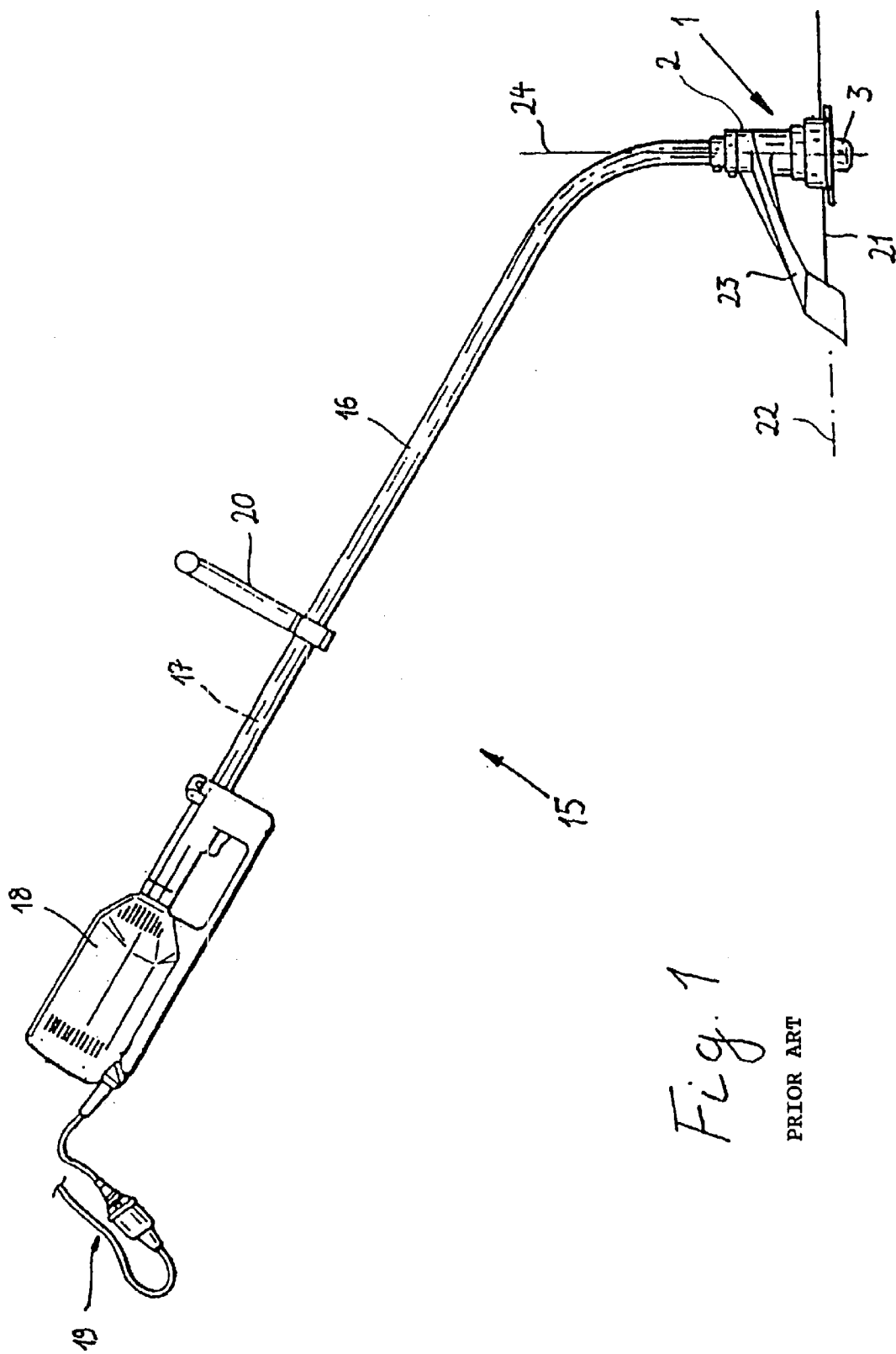
FIG. 1 is a side view showing the essential components of a trimmer of the state of the art.

The tool head of the present invention comprises a gear mechanism housing and a rotatably drivable tool shaft that is mounted in the housing and on which is held a hub portion that rotates with the tool shaft. On that side that faces the hub portion the tool head is provided with at least one stripping edge, which has a radial component that extends from the inside to the outside, and that projects beyond the contour of the hub portion.

Material that has been cut off and accumulates on the hub portion is thus carried along with the rotational movement of the hub portion until it encounters the stripping edge. At this location, the stripping edge leads to a reliable removal of the cut material from the hub portion, and prevents a winding-on of longer cut material that builds up over a number of rotations. Due to the removal or stripping of the cut material via the cutting edge, lower centrifugal forces are also adequate for releasing cut material. The tool head and the hub portion can be of compact construction with small diameters, thereby improving the handling of the trimmer. The reliable removal even of wet cut material that tends to stick increases the operational reliability and hence the productivity of the trimmer.

Pursuant to one advantageous further development, the stripping edge, relative to the contour of the hub portion, has a radially inwardly disposed edge portion, so that the stripping edge extends from this radially inwardly disposed edge portion to a radially outwardly disposed edge portion. Consequently, a flat side that faces the tool head, and that is part of a hub portion that projects beyond the tool head, can also be reliably kept free of accumulations of cut material. To improve the stripping effect, the stripping edge has a course that rotates along with the tool shaft and extends at an angle from the inside to the outside. The inclined course leads to a peeling effect with little expenditure of energy, and enhances the transporting away of accumulations in a radially outward direction.

Where the stripping edge is embodied as a sharpened cutting edge, in addition to a scraping or peeling off of accumulations, a reduction in size and hence a simplified transporting away of particles that have been deposited on the hub portion is also achieved. A stripping surface that is associated with the stripping edge and is disposed transverse to the direction of movement of the hub portion enhances the outward transporting away of loosened accumulations in that the transversely-disposed stripping surface conducts the removed material laminarly outwardly and avoids a raising of the deposited cut material beyond the stripping edge in a direction toward the inner region of the tool head. In this connection, the stripping surface is disposed either approximately parallel to the axial direction of the tool shaft, or is disposed at a slightly inclined angle relative thereto. A slight incline of the stripping surface leads to a more pronounced defining of the stripping edge or the sharpened cutting edge, and facilitates the removal of deposits or accumulations in the axial direction. The last-mentioned effect can be enhanced by a concave curvature of the stripping surface, which leads to a peeling away of the accumulations with a high effectiveness at a low energy requirement, thereby avoiding a braking effect upon the tool shaft.

Pursuant to an expedient further development, the stripping edge is formed by an arresting flange that projects radially from the tool head and serves for accommodating arresting means for the tool shaft. For example, arresting means can be guided through a bore in the arresting flange and can be introduced into an engagement opening in the hub portion. This blocks the rotatability of the tool shaft. It is then readily possible to exchange a cutting tool on the tool shaft. In this connection, the arresting flange fulfills a dual function of arresting the tool shaft and as a stripping device. While avoiding corresponding structural and manufacturing expenses, no additional devices are required for forming an appropriate stripping edge. The engagement opening on the hub portion for the arresting means is advantageously embodied so as to be open outwardly in the radial direction. This prevents cut-off material from accumulating in the engagement opening. Particles that have been cut off can readily be flung outwardly out of this region due to the effective centrifugal force. The hub portion, which interacts with the stripping edge, is advantageously a pressure plate or a cutting tool that is to be disposed thereagainst. The flat configuration of the pressure plate, with a relatively large diameter, leads to a good flinging-away effect. Due to its arrangement directly between the gear mechanism housing and the rotatable tool, and in conjunction with the stripping edge, the entire hub region between the rotatable cutting tool and the gear mechanism housing is reliably kept free from deposits of dirt.

Further specific features of the present invention will be described in detail subsequently.

DESCRIPTION OF PREFERRED EMBODIMENTS

Referring now to the drawings in detail, FIG. 1, in a side view and in general, shows a brush cutter or trimmer 15 having a guide tube 16, one end of which is provided with a drive unit 18 having a non-illustrated electric motor. The electric motor is supplied with operating voltage via a power cord 19. An internal combustion engine, for example a two-cycle or four-cycle engine, can also be provided as a drive motor. That end of the guide tube 16 that is opposite the drive unit 18 is angled off and is fixed in position on a tool head 1. The tool head 1 has a gear mechanism housing 2 in which a tool shaft 3 is rotatably mounted about an axis of rotation 24. A cutting tool 1 is fixed on the tool shaft 3 and is rotatably drivable, via the drive unit 18, in a plane of rotation 22 that is disposed perpendicular to the axis of rotation 24. Mounted in the guide tube 16 is an elastic drive shaft 17 that is introduced into the gear mechanism housing 2 coaxially to the axis of rotation 24. The cutting tool 21 is connected, via the drive shaft 17, with the drive motor in the drive unit 18 in a torque-transmitting manner. In the illustrated embodiment, the gear mechanism housing 2 serves for the mounting of the tool shaft 3. Fixed in position on the gear mechanism housing 2 is a protective hood 23 for the rotating cutting tool 21. Fixed in position on the guide tube 16 is a guide handle 20 for guiding the trimmer 15.

Figure 2:
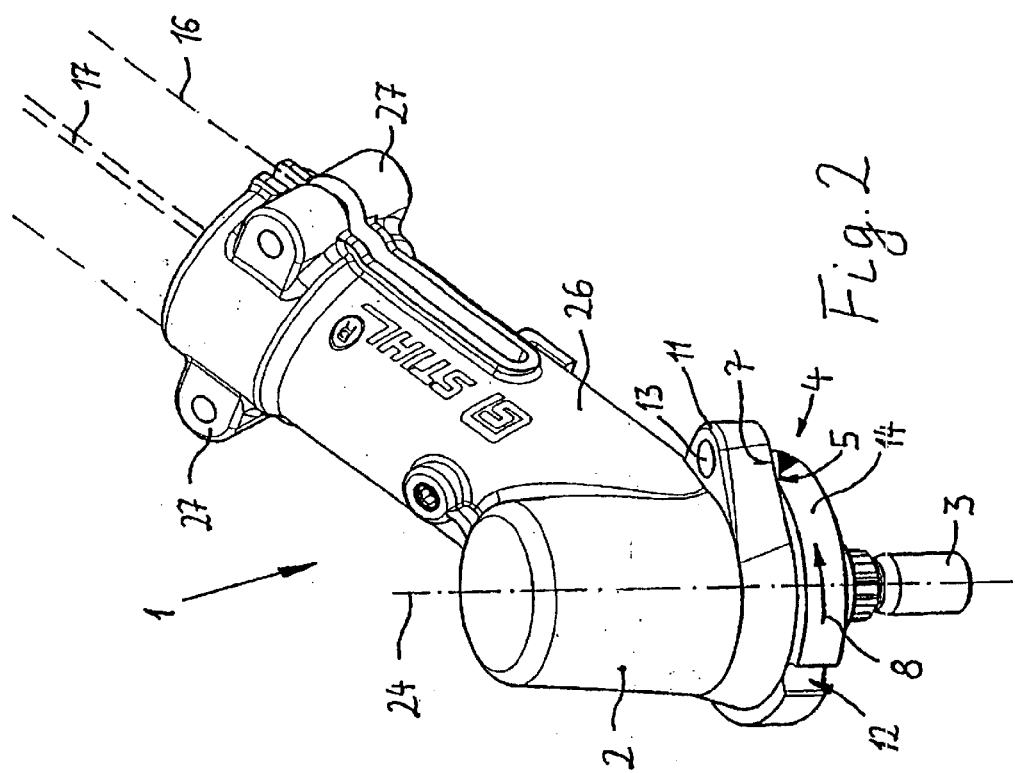
FIG. 2 is a perspective view of an inventive tool head, having a stripping edge, for a trimmer.

FIG. 2 shows an inventive variation of a tool head 1 for a trimmer 15 according to FIG. 1, whereby the gear mechanism housing 2 is provided with an angularly projecting shaft 26 having clamps 27 for receiving the guide tube 16. Disposed in the gear mechanism housing 2 is a non-illustrated miter gear for the torque-transmission from the drive shaft 17 to the tool shaft 3. The tool shaft 3, together with the hub portion 4, are rotatable in the direction of the arrow 8. The hub portion 4 can be a mounting or bearing flange or the like, and in the illustrated embodiment is a pressure plate 14 that is made of polymeric material and serves for the engagement of the cutting tool 21 (FIG. 1).

In the illustrated embodiment, the hub portion 4, in the form of the pressure plate 14, has a larger diameter than does the gear mechanism 2. The tool head 1, on the gear mechanism housing 2, is provided with an arresting flange 11 that projects radially beyond the pressure plate 14 and has a bore 13. In correspondence with the bore 13, there is disposed on the pressure plate 14 at least one engagement opening 12 that is open radially outwardly. To arrest the tool shaft 3, together with the pressure plate 14, arresting means can be introduced through the bore 13 and into the engagement opening 12. A screwdriver or the like is, for example, suitable as an arresting means.

Formed by the arresting flange 11, on that side that faces the hub portion 4, i.e. the pressure plate 14, is a stripping edge 5 that has a radial component extending from the inside to the outside, and projects beyond the contour of the pressure plate 14. In this connection, relative to the contour of the pressure plate 14, the stripping edge 5 is provided with a radially inner edge portion and a radially outer edge portion 7 respectively. However, an embodiment having only a radially outer edge portion 7 can also be expedient. Relative to the direction of rotation indicated by the arrow 8, the stripping edge 5 rotates along at an angle from the inside to the outside. Depending upon the application, a radial progress approximately perpendicular to the direction of rotation 8 can also be expedient.

Figure 3:
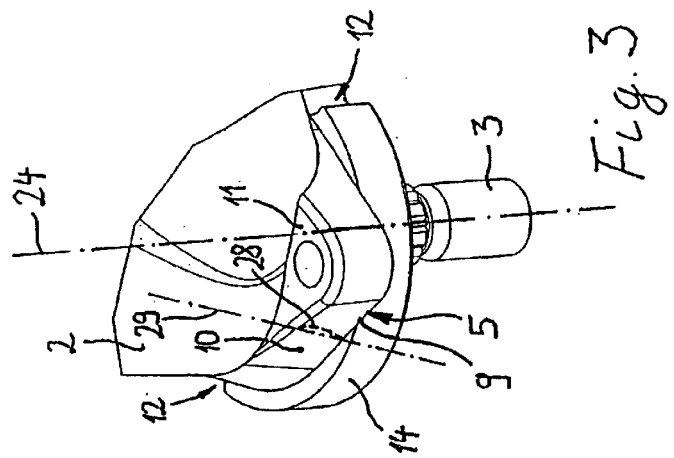
FIG. 3 is an enlarged partial view of the tool head of FIG. 2 showing details in the region of the stripping edge.

The enlarged sectional view of FIG. 3 shows a region of the arresting flange 11 from the tool head 1 of FIG. 2. The stripping edge 5, which faces the pressure plate 14, is, in the illustrated embodiment, embodied as a sharpened cutting edge 9. Adjoining the cutting edge 9 or stripping edge 5, in the direction of thickness of the arresting flange 11, is a stripping surface 10. As indicated by the dot-dash line 29, the stripping surface 10 is inclined rearwardly relative to the axis of rotation 24 and the direction of rotation 8. Furthermore, in conformity with the dashed line 28, the stripping surface 10 is concavely curved.

The specification incorporates by reference the disclosure of German priority document 102 16 730.3 filed Apr. 16, 2002.

The present invention is, of course, in no way restricted to the specific disclosure of the specification and drawings, but also encompasses any modifications within the scope of the appended claims.

What is claimed is:

1. A tool head of a trimmer, comprising:
a gear mechanism housing;
a rotatably drivable tool shaft that is mounted in said gear mechanism housing; and
a hub portion that is held on, and rotates with, said tool shaft, wherein on a side that faces said hub portion said tool head is provided with at least one stripping edge, which has a radial component that extends from an inner region to an outer region, and which projects beyond a contour of said hub portion.

2. A tool head according to claim 1, wherein said stripping edge is provided, relative to said contour of said hub portion, with a radially inwardly disposed edge portion.

3. A tool head according to claim 1, wherein said stripping edge extends at an angle from the inside to the outside in a direction rotating along with a direction of rotation of said tool shaft.

4. A tool head according to claim 1, wherein said stripping edge is embodied as a cutting edge.

5. A tool head according to claim 1, wherein said stripping edge is associated with a stripping surface.

6. A tool head according to claim 5, wherein said stripping surface is inclined relative to an axial direction of said tool shaft.

7. A tool head according to claim 5, wherein said stripping surface has a concavely curved configuration.

8. A tool head according to claim 1, wherein said stripping edge is formed by an arresting flange that projects radially beyond said tool head and serves for receiving arresting means for arresting said tool shaft.

9. A tool head according to claim 8, wherein said hub portion is provided with an engagement opening that is open in a radially outward direction and serves for receiving said arresting means.

10. A tool head according to claim 1, wherein said hub portion is a pressure plate for receiving a cutting tool thereagainst.

* * * * *